United States Patent
Suzuki

[11] Patent Number: 6,157,878
[45] Date of Patent: Dec. 5, 2000

[54] CHASSIS DYNAMOMETER CONTROL SYSTEM

[75] Inventor: Masahiko Suzuki, Shizuoka, Japan

[73] Assignee: Kabushiki Kaisha Meidensha, Tokyo, Japan

[21] Appl. No.: 09/253,052

[22] Filed: Feb. 19, 1999

[30] Foreign Application Priority Data

Feb. 25, 1998 [JP] Japan .................................. 10-043036

[51] Int. Cl.[7] .............................. G06F 7/00; G06F 19/00
[52] U.S. Cl. ..................... 701/29; 73/862.08; 73/862.13; 73/862.18
[58] Field of Search ................................. 701/29, 30, 31, 701/34, 63; 73/117, 862.09, 862.17, 862.18, 862.08, 862.13

[56] References Cited

U.S. PATENT DOCUMENTS

| | | | |
|---|---|---|---|
| 4,327,578 | 5/1982 | D'Angelo | 73/117 |
| 5,195,038 | 3/1993 | Yagi et al. | 73/116 |
| 5,447,060 | 9/1995 | Smith et al. | 73/117 |
| 5,531,107 | 7/1996 | Ganzhorn | 73/117 |
| 5,844,145 | 12/1998 | D'Angelo | 73/862.18 |
| 6,009,740 | 1/2000 | Devendorf et al. | 73/1.13 |

OTHER PUBLICATIONS

Yoshihiko; "Control System for Engine Tester"; Patent Abstracts of Japan; Publication No. 61110026; Publication Date: May 28, 1986; Abstract.

*Primary Examiner*—William A. Cuchlinski, Jr.
*Assistant Examiner*—Gertrude Arthur
*Attorney, Agent, or Firm*—Foley & Lardner

[57] ABSTRACT

A chassis dynamometer is arranged to test a vehicle operated thereon so as to follow up a target vehicle speed. A controlling system determines a load as a command torque from a detected actual vehicle speed of the vehicle on the chassis dynamometer and controls a running resistance of the vehicle by controlling a dynamometer unit in accordance with the load. The controlling system comprises a monitoring section for detecting an abnormal condition indicative of a vehicle's disability to follow up the target speed by monitoring a speed deviation between the detected actual vehicle speed and the target speed, and a correcting section for correcting the command torque to reduce the speed deviation when the abnormal condition is detected.

13 Claims, 5 Drawing Sheets

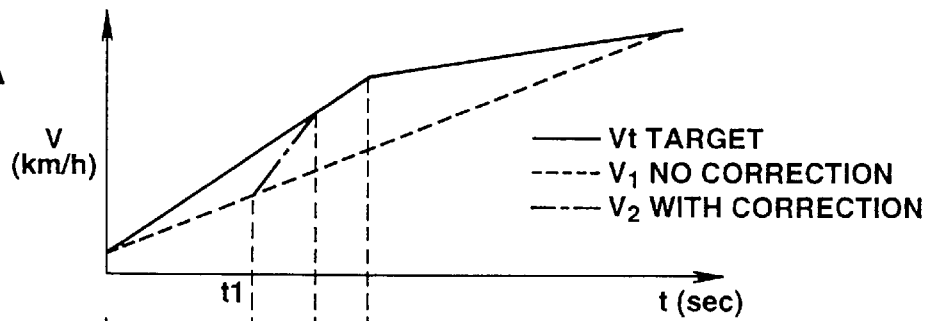
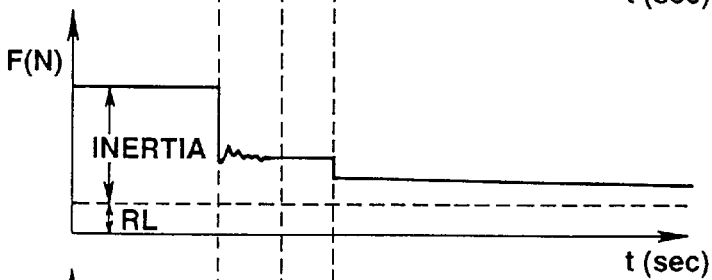
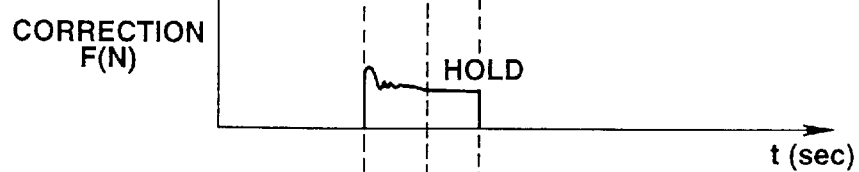
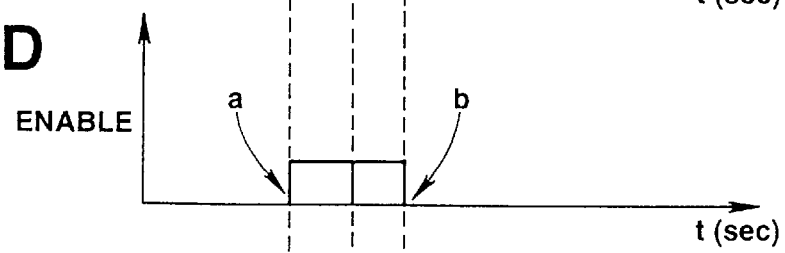
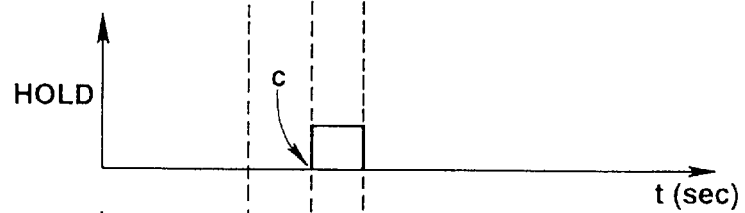
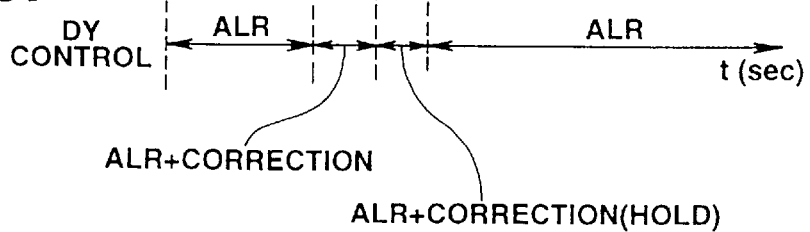

CHASSIS DYNAMOMETER CONTROL SYSTEM

BACKGROUND OF THE INVENTION

The present invention relates to a chassis dynamometer and more specifically to a control system or process for controlling a chassis dynamometer.

A chassis dynamometer is used for vehicle testing such as exhaust emission testing. A test vehicle is operated on a chassis dynamometer so as to follow a predetermined vehicle speed pattern simulating driving situations of a given vehicle. When the test vehicle is lower in output than the given vehicle, the test vehicle on the chassis dynamometer may become unable to follow up the vehicle speed pattern (according to EPAUS06 mode, for example).

SUMMARY OF THE INVENTION

It is an objective of the present invention to provide a chassis dynamometer control system or process ensuring a vehicle's capability of following up a target vehicle speed.

According to the present invention, a controlling system for monitoring a detected actual vehicle of a test vehicle operated on a chassis dynamometer so as to follow a target vehicle speed, for determining a command torque corresponding to a load of the test vehicle from the detected actual vehicle speed and for controlling the chassis dynamometer in accordance with the command torque to control a running resistance to the test vehicle, comprises a controller (or control circuit).

The controller detects an abnormal condition indicative of a vehicle's disability to follow up the target vehicle speed, by monitoring the detected actual vehicle speed and the target vehicle speed.

Moreover, the controller determines a correction quantity in accordance with a vehicle speed deviation between the actual vehicle speed and the target vehicle speed to ensure an ability to follow up the target vehicle speed, and adds the correction quantity to the command torque when the abnormal condition is detected.

The controller may comprise a speed monitoring section for detecting the abnormal condition by monitoring the detected actual vehicle speed, the target vehicle speed and a condition of an accelerator system of the test vehicle, and a correcting section for modifying the command torque by adding the correction quantity when the abnormal condition is detected.

BRIEF DESCRIPTION OF THE DRAWINGS

FIGS. 3A–3F show a time chart for illustrating operations of the chassis dynamometer system of FIG. 1.

DETAILED DESCRIPTION OF THE INVENTION

Figure 4:
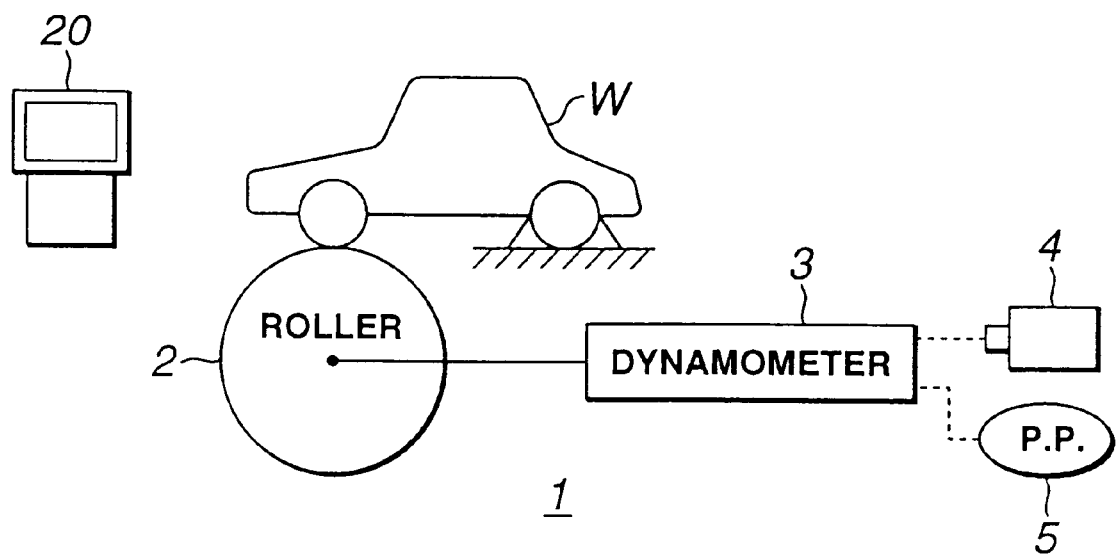
FIG. 4 is a schematic view showing basic vehicle testing equipment, to facilitate understanding of the present invention.

FIG. 4 shows a basic configuration of a chassis dynamometer 1 used for testing exhaust emissions and other vehicle performance. A test vehicle W is mounted and operated on the chassis dynamometer 1, as shown in FIG. 4. A dynamometer unit 3 performs a running resistance control, and a driver operates the vehicle attempting to follow a vehicle speed pattern (or driving cycle) shown on a monitor of a driver aid 20. The speed pattern is predetermined according to standards or regulations.

Figure 5:
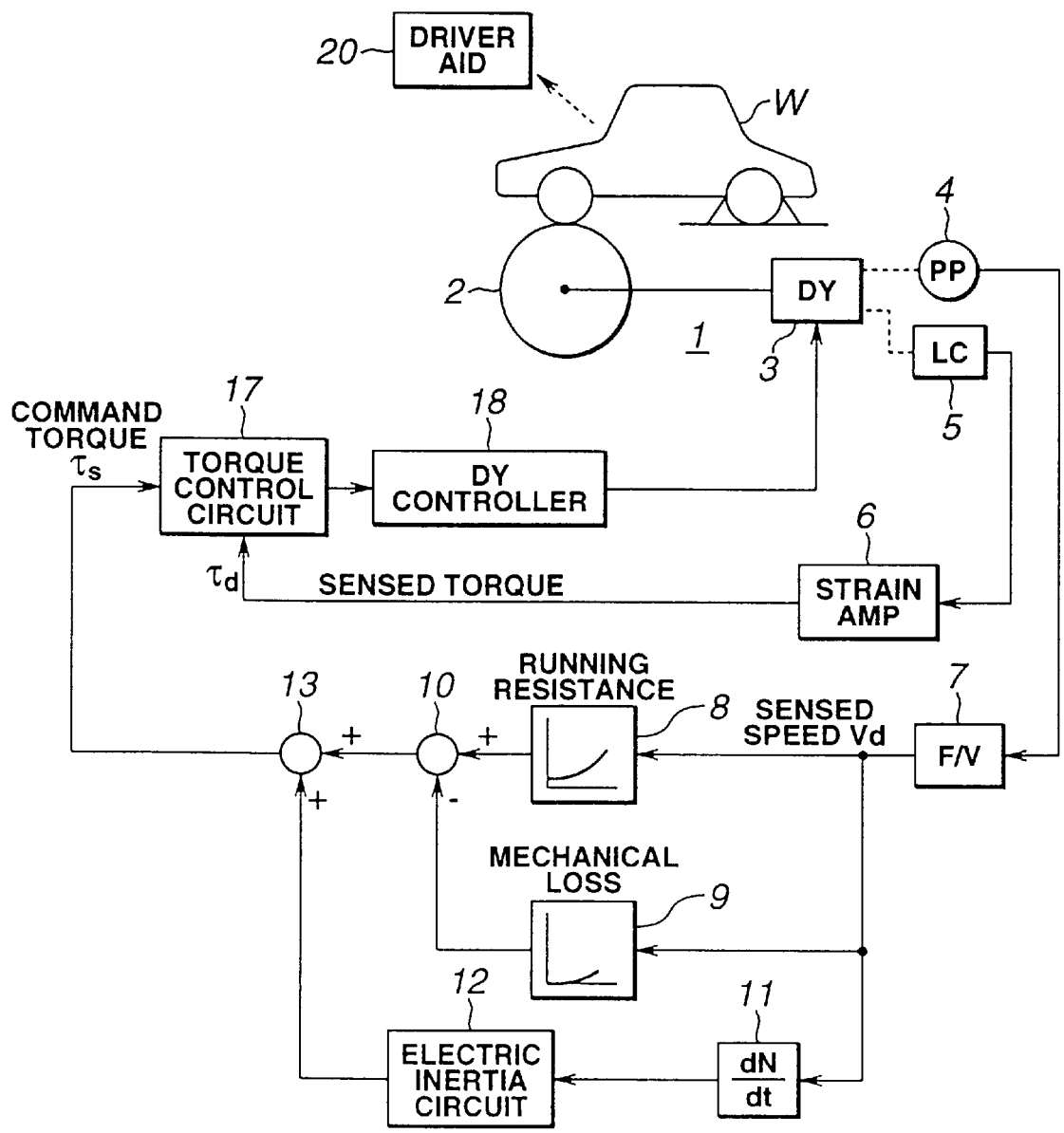
FIG. 5 is a block diagram showing a basic control circuit for controlling a running resistance of a dynamometer shown in FIG. 4.

FIG. 5 shows a basic control circuit for the running resistance control of the dynamometer unit 3.

A pulse pickup 4 and a frequency-to-voltage converter 7 are configured to detect a vehicle speed Vd of the test vehicle. A torque sensor 5 and a strain amplifier 6 detect a torque τs of the dynamometer unit 3.

A function generator 8 receives a vehicle speed signal representing the detected actual vehicle speed Vd from the frequency-to-voltage converter 7, and produces an output signal representing a running resistance in accordance with the vehicle speed signal. A function generator 9 produces an output signal representing a mechanical loss in response to the vehicle speed signal Vd from the frequency-to-voltage converter 7. A differentiating circuit 11 receives the vehicle speed signal Vd from the frequency-to-voltage converter 7 and produces an acceleration signal representing an acceleration by differentiating the detected actual vehicle speed Vd. An electric inertia circuit 12 receives the acceleration signal from the differentiating circuit 11 and produces an inertia signal representing an electric inertia by converting the acceleration into the electric inertia. Adders 10 and 13 cooperate to determine a load by algebraically adding the running resistance, the mechanical loss and the electric inertia with the positive and negative polarities as shown in FIG. 5, and thereby to produce a command torque signal representing a command torque τs representing the load.

A torque control circuit 17 receives the command torque signal τs from the adder 13 and the actual torque signal τd from the strain amplifier 6, determines a torque deviation between the command torque τs and the detected actual torque τd, produces a control signal in dependence on the torque deviation according to a PI control. A dynamometer controller 18 receives the control signal as current command, and controls the dynamometer unit 3 in response to the control signal.

A vehicle speed pattern for emission testing is generally prepared by using a given vehicle. When the output of the test vehicle is lower than the given vehicle of the speed pattern, the test vehicle tends to lag behind the target vehicle speed pattern and to become unable to follow up the target vehicle speed pattern (such as a drive cycle of EPAUS6 mode) because of its deficiency in the output.

Figure 1:
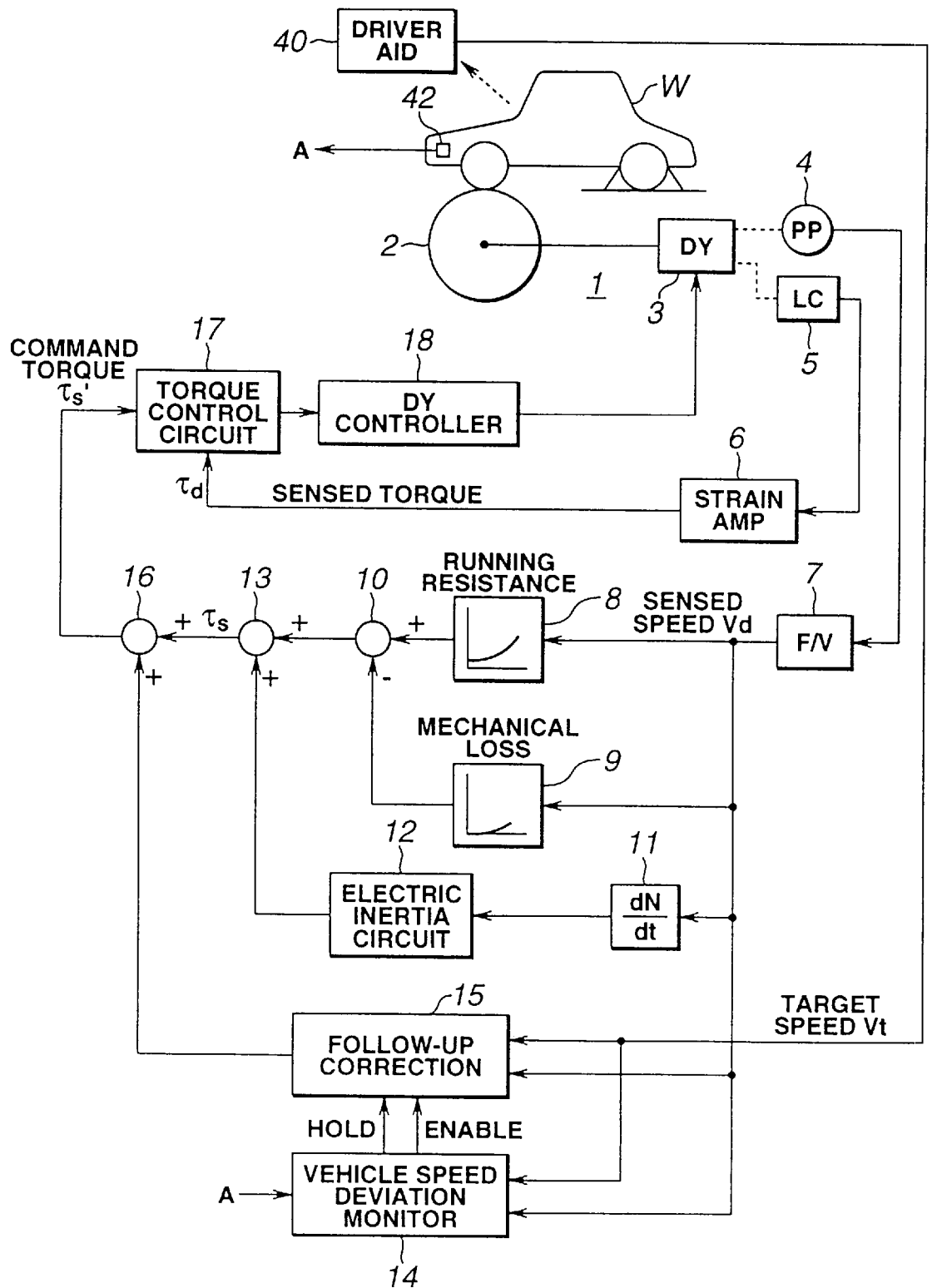
FIG. 1 is a block diagram showing a chassis dynamometer system according to one embodiment of the present invention.

FIG. 1 shows a chassis dynamometer system according to one embodiment of the present invention aimed to prevent a test vehicle on a chassis dynamometer from becoming unable to follow up a target. The chassis dynamometer system is in the form of a control system including the chassis dynamometer 1 as a controlled system, and a controlling system which, in this example, in the form of a control circuit.

In addition to the components shown in FIG. 5, The chassis dynamometer controlling system of FIG. 1 comprises a monitoring section 14 for monitoring a vehicle speed deviation, and a correcting section 15 for modifying the command torque τs supplied to the torque control circuit 17 in dependence on a result of a monitoring operation of the monitoring section 14.

A drive system 40 of this example is in the form of a driver aid as in the basic system of FIG. 5.

Figure 2:
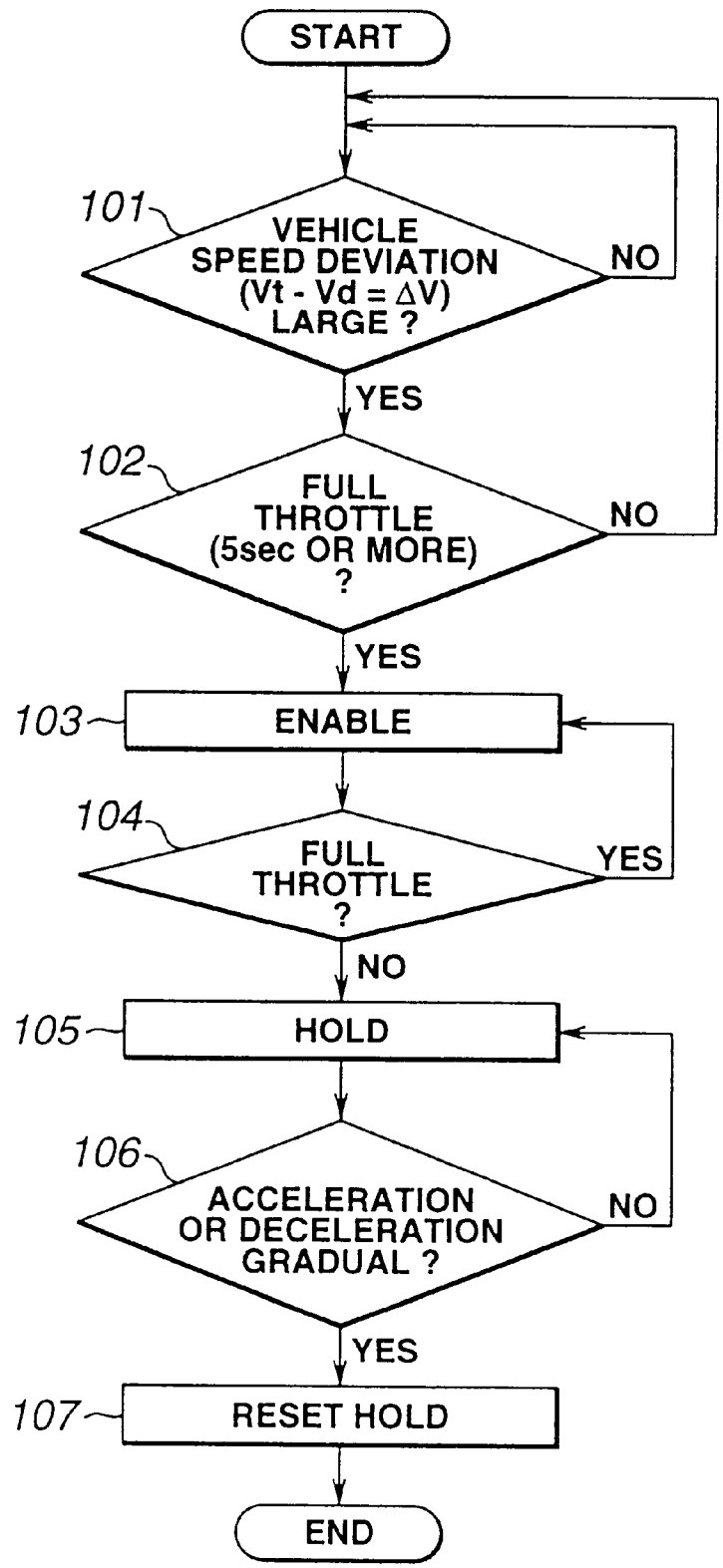
FIG. 2 is a flowchart showing a vehicle speed follow-up correction control process performed by a control circuit shown in FIG. 1.

The monitoring section 14 receives a target vehicle speed signal representing the target vehicle speed Vd from the driver aid 40, an actual vehicle speed signal representing the detected actual vehicle speed Vd from the frequency-to-voltage converter 7 and an accelerator opening signal representing an accelerator opening (degree) of the test vehicle W from an accelerator position sensor 42 installed in the test vehicle. By monitoring these input parameters, the monitoring section 14 controls a correcting operation of the correcting section 15 according to a correction control process shown in FIG. 2.

The correcting section 15 receives the target vehicle speed Vt and the detected actual vehicle speed Vd, and produces a correction signal representing a correction quantity under the control of flags (or condition signals) produced by the monitoring section 14.

An adder 16 determines a modified command target $\tau s'$ by adding the correction quantity determined by the correcting section 15 to the command target $\tau s$ outputted from the adder 13.

In the other points, the control circuit of FIG. 1 is substantially identical to the control circuit of FIG. 5.

In this example, a driver operates the test vehicle, following a target vehicle speed displayed on the driver aid 40. The dynamometer unit 3 is controlled to control the running resistance normally in accordance with the command torque $\tau s$ outputted from the adder 13.

The monitoring section 14 compares the detected actual vehicle speed Vd with the target vehicle speed Vt, and determines, at a step 101, whether the vehicle speed deviation $\Delta V$ of the actual vehicle speed Vd from the target vehicle speed Vt is equal to or greater than a predetermined deviation value. If the speed deviation $\Delta V$ is equal to or greater than the predetermined deviation value, then the monitoring section 14 further checks whether the accelerator of the test vehicle is in a fully open condition or not, at a step 102. In this example, the answer of the step 102 is affirmative if the accelerator opening A remains equal to 100% for a time duration equal to or longer than 5 sec. If the vehicle speed deviation $\Delta V$ is not large or if the accelerator is not in the fully open condition, the monitoring section 14 considers the test vehicle to be in a condition capable of follow up the target vehicle speed Vt, and hence holds the correction section 15 inoperative.

If the vehicle speed deviation $\Delta V$ becomes large because of a large increase of the target vehicle speed Vt, and the throttle of the test vehicle is judged to be in the fully open state at a time point t1 shown in FIG. 3A, then the monitoring section 14 sets a correction control enable flag at a step 103 as shown at "a" in FIG. 3D.

In response to the correction control enable flag, the correcting section 15 produces the correction signal representing the correction quantity so as to reduce the vehicle speed deviation $\Delta V$. The adder 16 receives the correction signal, determines a modified command torque $\tau s'$ by adding the correction quantity to the command torque $\tau s$ determined by the adder 13, and supplies the modified command torque $\tau s'$ to the torque control circuit 17.

By this correction of the command torque, the actual vehicle speed varies from a line V1 to a line V2 shown in FIG. 3A, the vehicle regains an ability to follow up the target vehicle speed Vt, and the throttle opening degree decreases. The monitoring section 14 checks whether the throttle is in the fully open state at a step 104 following the step 103. When the throttle opening degree decreases from the full throttle condition, the monitoring section 14 sets a hold flag at a step 105 as shown at "c" in FIG. 3E, expecting the driver to control the vehicle speed with the accelerator.

In response to the hold flag, the correcting section 15 holds the correction quantity constant at a then-existing value as shown in FIG. 3C.

This correcting operation is not required when an increase in the target vehicle speed Vt becomes low. Therefore, the monitoring section 14 checks, at a step 106, whether the rate of variation of the target vehicle speed Vt (i.e. the acceleration or deceleration of the target vehicle speed) is gradual. When the rate of variation of the target vehicle speed Vt becomes smaller than a predetermined rate, the monitoring section 14 resets the hold flag at a step 107 as shown at "b" in FIG. 3D, and thereby terminates the correcting operation. Therefore, the chassis dynamometer 1 is restored to the normal control mode for controlling the running resistance without the vehicle speed correcting control on the dynamometer's side.

In this way, the control system according to this embodiment ensures the vehicle's capability of following up the target speed. If, during a driver's operation for following up the target vehicle speed Vt displayed on the driver aid 20, the acceleration of the target vehicle speed Vt increases and the vehicle speed V becomes unable to follow up the target vehicle speed Vt, the control system determines the correction quantity in accordance with the vehicle speed deviation $\Delta V$ so as to reduce the vehicle speed deviation $\Delta V$ to zero, adds the correction quantity to the command torque $\Delta s$ corresponding to the load, and thereby decreases the load so that the vehicle speed can follow up the target speed.

The control system according to this embodiment can maintain the follow-up capability not only when the acceleration increases as in the illustrated example, but also when the deceleration of the target vehicle speed increases. In the case of an increase of the deceleration, the control system maintain the vehicle's capability of following up the target speed by increasing the load.

In the illustrated example, the drive system 40 is the drive aid for assisting a human driver in operating the test vehicle W. Alternatively, the drive system 40 may be an automatic apparatus for receiving the target vehicle speed Vt and controlling the accelerator of the test vehicle W automatically so as to reduce the vehicle speed deviation.

In this example, the controlling system comprises a correction controller. The correction controller of this example comprises the monitoring section 14 and the correcting section 15.

What is claimed is:

1. A controlling system for monitoring a detected actual vehicle speed of a test vehicle operated on a chassis dynamometer so as to follow a target vehicle speed, for determining a command torque corresponding to a load of the test vehicle from the detected actual vehicle speed and for controlling the chassis dynamometer in accordance with the command torque to control a running resistance to the test vehicle, the controlling system comprising:

a speed monitoring section for detecting an abnormal condition indicative of a vehicle's disability to follow up the target vehicle speed, by monitoring the detected actual vehicle speed, the target vehicle speed and an accelerator opening of the test vehicle; and a correcting section for determining a correction quantity in accordance with a vehicle speed deviation between the actual vehicle speed and the target vehicle speed to ensure an ability to follow up the target vehicle speed, and for adding the correction quantity to the command torque when the abnormal condition is detected.

2. The controlling system as claimed in claim 1 wherein the monitoring section is configured to monitor the accelerator opening and a time rate of change of the target vehicle speed during a correcting operation of the correcting section, to cause the correction section to hold the correction quantity constant when the accelerator opening decreases from a predetermined fully open condition during the correcting operation of the correcting section, and to terminate the correcting operation when the time rate of change of the target vehicle speed becomes lower than a predetermined rate.

3. The controlling system as claimed in claim 2 wherein the monitoring section is configured to allow the correcting section to initiate the correcting operation of adding the correction quantity to the command torque when the vehicle speed deviation is equal to or greater than a predetermined deviation value and at the same time the accelerator opening is equal to or greater than a predetermined full opening degree corresponding to the fully open condition of an accelerator of the test vehicle.

4. The controlling system as claimed in claim 1 wherein the controlling system comprises an automatic drive apparatus for operating the test vehicle on the chassis dynamometer automatically.

5. A chassis dynamometer system comprising:
   a chassis dynamometer for allowing a test vehicle to be operated thereon so as to follow a target vehicle speed; and
   a controller for controlling a running resistance of the test vehicle by controlling the chassis dynamometer in accordance with a load indicative command torque determined from a detected actual vehicle speed of the test vehicle, for monitoring the target vehicle speed and the actual vehicle speed to detect a predetermined abnormal condition indicative of a vehicle's disability to follow up the target vehicle speed, for determining a correction quantity in accordance with a vehicle speed deviation of the detected actual vehicle speed from the target vehicle speed, and for adding the correction quantity to the command torque when the abnormal condition is detected.

6. The chassis dynamometer system as claimed in claim 5 wherein the controller is configured to determine the load indicative command torque from the detected actual vehicle speed, to control the chassis dynamometer in accordance with a torque deviation between the command torque and a detected torque, to detect the predetermined abnormal condition by monitoring the vehicle speed deviation between the detected actual vehicle speed and the target vehicle speed, to determine the correction quantity in accordance with the vehicle speed deviation, and to add the correction quantity to the command torque when the abnormal condition is detected.

7. The chassis dynamometer system as claimed in claim 6 wherein the controller is configured to initiate a correcting operation of adding the correction quantity to the command torque when the vehicle speed deviation between the target vehicle speed and the actual vehicle speed is equal to or greater than a predetermined deviation value, and simultaneously an accelerating system of the test vehicle is in a predetermined fully open condition, to monitor a condition of the accelerating system and a time rate of change of the target vehicle speed during the correcting operation, to hold the correction quantity constant when the accelerating system is out of the fully open condition and to terminate the correcting operation when the time rate of change of the target vehicle speed is lower than a predetermined rate.

8. The chassis dynamometer system as claimed in claim 5 wherein the controller comprises:
   a speed detecting section for determining the detected actual vehicle speed of the test vehicle operated on the chassis dynamometer;
   a torque detecting section for determining a detected actual torque of the test vehicle;
   a torque command section for determining the load indicative command torque from the detected actual vehicle speed;
   a torque control section for controlling the chassis dynamometer in accordance with a torque deviation between the command torque and the detected torque;
   a speed monitoring section for detecting the predetermined abnormal condition by monitoring the speed deviation between the detected actual vehicle speed and the target vehicle speed; and
   a correcting section for determining the correction quantity in accordance with the speed deviation and adding the correction quantity to the command torque when the abnormal condition is detected.

9. The chassis dynamometer system as claimed in claim 8 wherein the monitoring section comprises a first input for receiving the target vehicle speed, a second input for receiving the detected actual vehicle speed and a third input for receiving an accelerator condition signal representing a condition of an accelerating system of the test vehicle, and the monitoring section is configured to cause the correcting section to initiate a correcting operation to add the correction quantity to the command torque when the speed deviation between the target vehicle speed and the actual vehicle speed is equal to or greater than a predetermined deviation value, and simultaneously the accelerating system is in a predetermined fully open condition.

10. The chassis dynamometer system as claimed in claim 9 wherein the monitoring section is configured to monitor the accelerator condition signal and a time rate of change of the target vehicle speed during the correcting operation of the correcting section, to hold the correction quantity constant when the accelerating system is moved away from the fully open condition, and to terminate the correcting operation when the time rate of change of the target vehicle speed becomes lower than a predetermined rate.

11. A chassis dynamometer control process for allowing a test vehicle to be operated on a chassis dynamometer so as to follow a target vehicle speed, and for controlling the chassis dynamometer to control a running resistance of the test vehicle in accordance with a load indicative command torque determined from a detected actual vehicle speed of the test vehicle, the control process comprising:
   a monitoring step of monitoring the target vehicle speed and the actual vehicle speed to detect a predetermined abnormal condition indicative of a vehicle's disability to follow up the target vehicle speed; and
   a correcting step of determining a correction quantity in accordance with a vehicle speed deviation of the detected actual vehicle speed from the target vehicle speed, and of adding the correction quantity to the command torque when the abnormal condition is detected.

12. The chassis dynamometer control process as claimed in claim 11 wherein the monitoring step comprises a first sub-step of examining whether the speed deviation of the detected actual vehicle speed from the target vehicle speed is equal to or greater than a predetermined deviation value and a second sub-step of examining whether an accelerator of the test vehicle is in a predetermined fully open state corresponding to a full throttle condition, and the correcting step comprises a sub-step for producing a first condition signal indicating the abnormal condition to initiate a correcting operation for adding the correction quantity to the command torque when the vehicle speed deviation is equal to or greater than the predetermined deviation value and simultaneously the accelerator is in the fully open state.

13. The chassis dynamometer control process as claimed in claim 12 wherein the control process further comprises a third step for examining whether the accelerator remains in the fully open state, a fourth step for holding the correction quantity constant at a then-existing value of the correction quantity when the accelerator is moved away from the fully open state, a fifth step for examining whether a time rate of change of the target vehicle speed is lower than a predetermined rate, and a sixth step for reducing the correction quantity to zero to terminate the correcting operation when the time rate of change of the target vehicle speed becomes lower than the predetermined rate.

* * * * *